Sept. 15, 1931.  C. C. SPREEN  1,823,804
COMPRESSOR BEARING SEAL
Filed Dec. 27, 1926
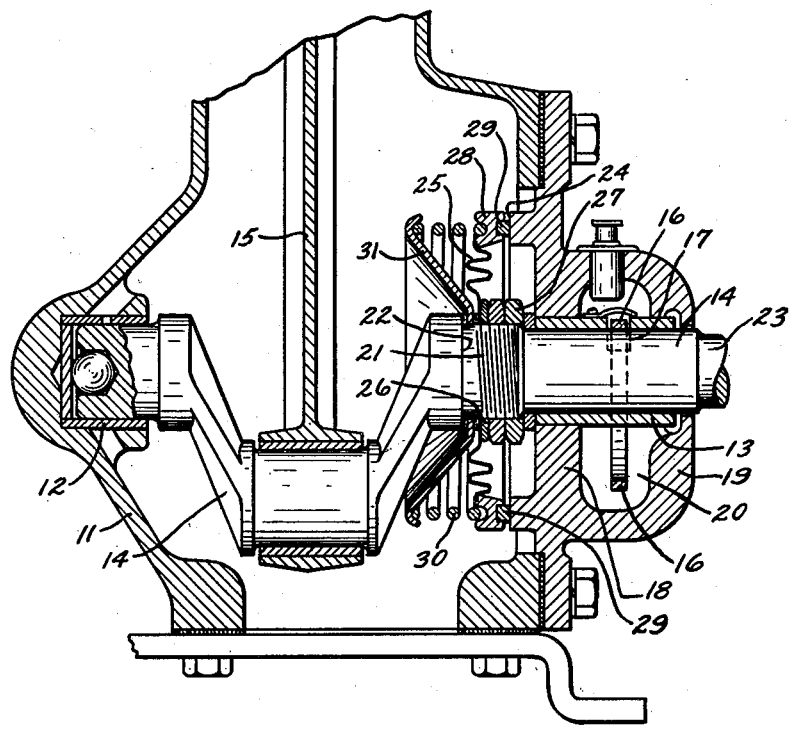
Charles C. Spreen
Inventor
By Smith and Freeman
Attorneys Patented Sept. 15, 1931

1,823,804

UNITED STATES PATENT OFFICE

CHARLES C. SPREEN, OF DETROIT, MICHIGAN

COMPRESSOR BEARING SEAL

Application filed December 27, 1926. Serial No. 157,208.

My invention relates to bearing seals, and particularly to means for sealing the drive shaft aperture in the casing of a refrigerant compressor, and the principal object of my invention is to provide new and improved means for this purpose. In the drawing accompanying this specification and forming a part of this application I have shown, for purposes of illustration, one form which my invention may assume, and in the drawing the single figure is a fragmentary central vertical section through a compressor showing the embodiment of my invention herein disclosed.

In the embodiment of my invention herein shown the lower portion of the compressor casing 11 is provided with a closed bearing 12 and a bearing sleeve 13 arranged to jointly support a crank shaft 14 which receives between the bearings 12 and 13 the usual connecting rod 15. The crank shaft 14 projects through the bearing sleeve 13 and is lubricated by means of a ring 16 riding on the shaft 14 in a slot 17 in the bearing sleeve 13. The slot 17 is formed in the shaft portion intermediate the inner and outer walls 18 and 19 of a closure member which supports the bearing sleeve 13 and which forms a receptacle 20 containing the lubricant to be fed by the lubricating ring 16. The crank shaft 14 is provided interiorly of the casing 11 with a threaded portion 21 terminating adjacent its inner end in a shoulder 22, and is provided exteriorly of the open-end bearing 13 with an extension 23 adapted to receive a suitable driving connection, not shown. The casing 11 is provided with an annular casing seat 24 formed on the inner face of the closure member receiving the bearing sleeve 13.

Closing the shaft aperture in the casing 11, particularly to prevent both the egress of refrigerant and the ingress of moisture, is a seal herein shown as comprising a generally radial flexible annular diaphragm 25 corrugated to increase its flexibility. The diaphragm 25 is secured at its inner edge to a base 26 sealed to the shaft 14 by means of nuts 27 screw-threadedly engaging the screw-threaded portion 21 of the shaft 14. The nuts 27 clamp the base 26 to the shaft 14 between themselves and the shoulder 22. The diaphragm 25 is secured at its periphery to a base 28 carrying an attached anti-friction ring 29. The ring 29 is held in rotary sealing engagement with the casing seat 24 by means of a spring 30 compressed between the base 28 and the inner face of a spider 31 which is clamped to the shaft 14 by means of the nuts 27 between the inner edge of the diaphragm 25 and the shoulder 22.

From the above description it will be apparent to those skilled in the art that I have provided a seal having a diaphragm extending substantially radially of the shaft, disposed within the casing, fixed at its inner edge to the shaft, removable as a unit, and rotatably sealed at its periphery to the casing by means of a spring compressed between a spider clamped to the shaft by the diaphragm securing means and the base secured to the periphery of the diaphragm.

Under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

In a bearing seal, the combination with a compressor casing having an aperture therethrough, a closure plate for said aperture provided with a bearing sleeve and an annular seat formed on the interior surface of said plate, and a crankshaft having shoulders interiorly of said casing formed by reduced portions thereof; of a seal structure arranged interiorly of said casing including a flexible annular diaphragm fixedly sealed at the inner edge against one of said crankshaft shoulders and rotatably sealed against said seat at the periphery of said diaphragm, means for fixedly sealing the inner edge of said diaphragm to said shaft, and means for rotatably sealing the periphery of said diaphragm to said seat.

In testimony whereof I hereunto affix my signature.

CHARLES C. SPREEN.